Figure 1:
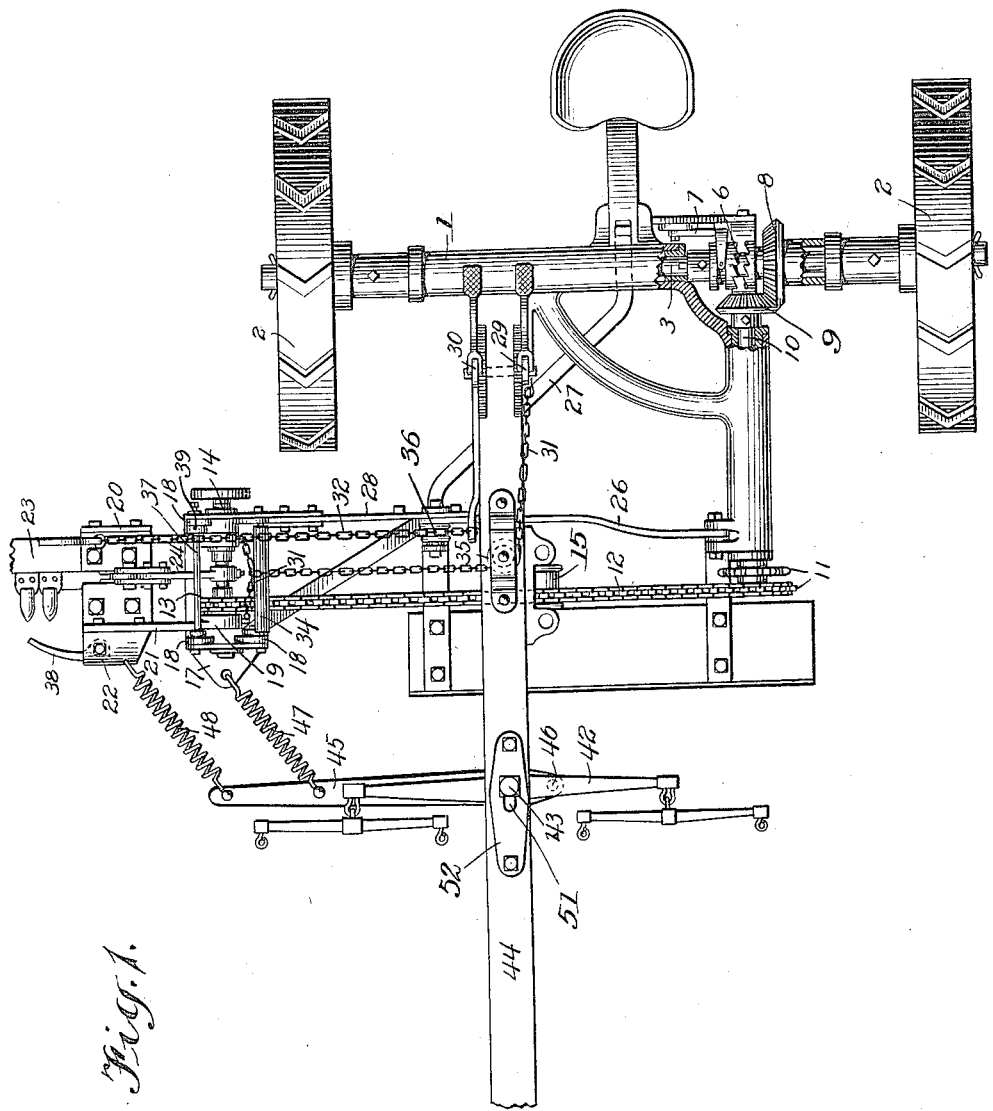

C. LORENSON.
MOWING MACHINE.
APPLICATION FILED NOV. 20, 1913.

1,140,175.

Patented May 18, 1915.
3 SHEETS—SHEET 1

WITNESSES
Frank C. Palmer

INVENTOR
Carl Lorenson
BY
ATTORNEYS

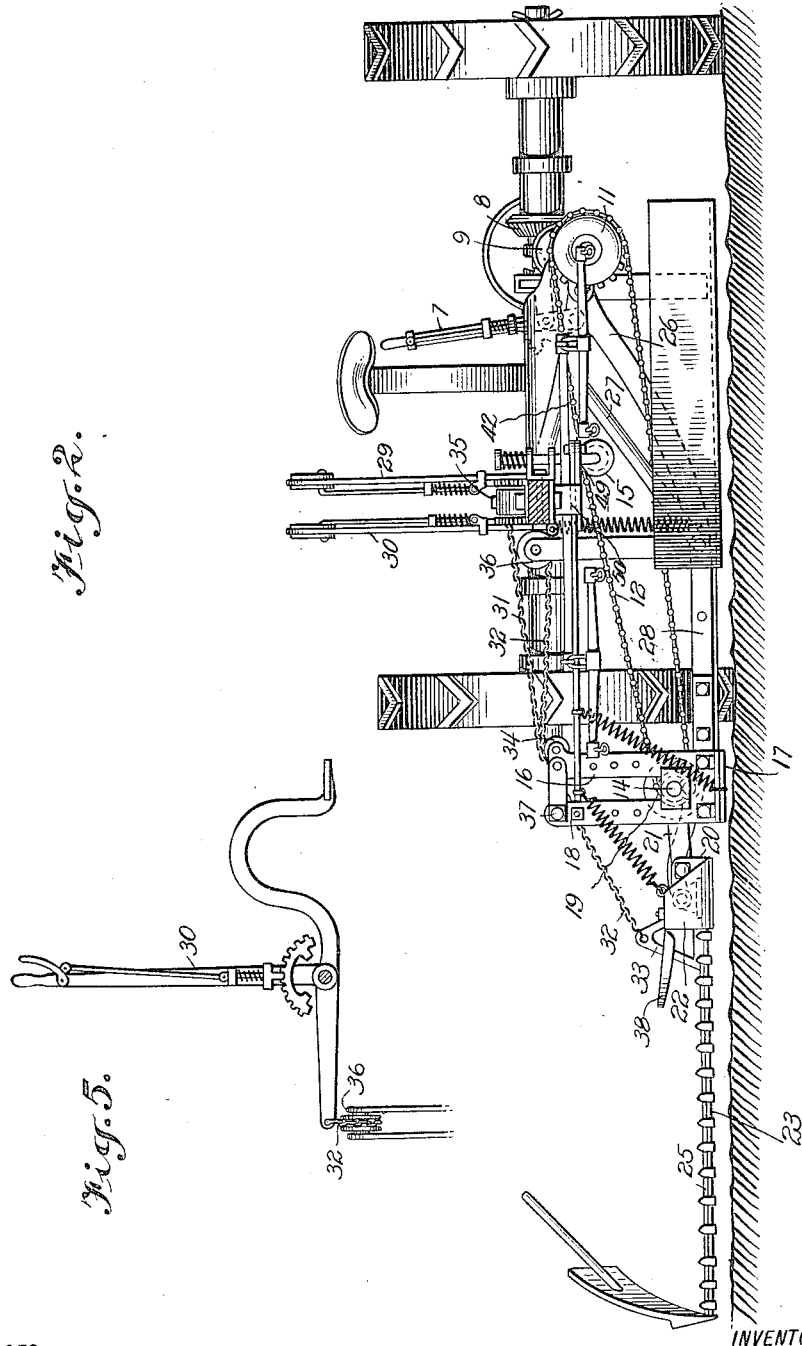

C. LORENSON.
MOWING MACHINE.
APPLICATION FILED NOV. 20, 1913.
1,140,175.
Patented May 18, 1915.
3 SHEETS—SHEET 3.
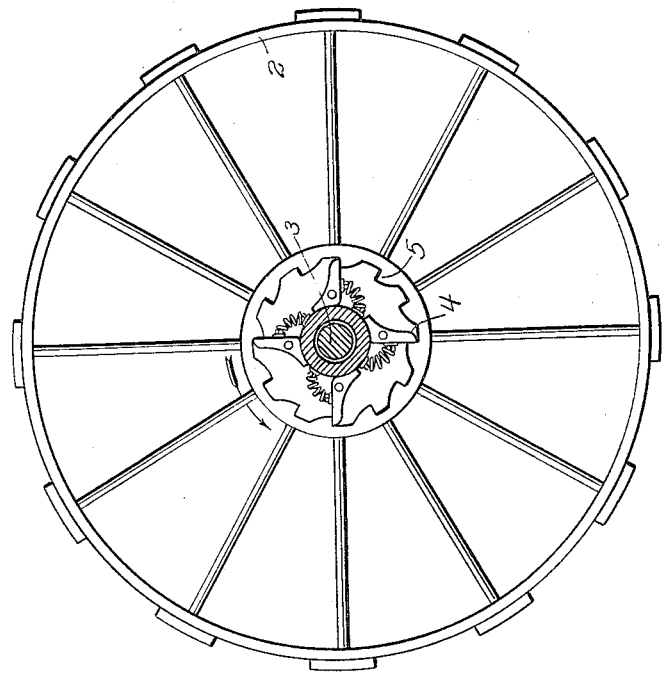
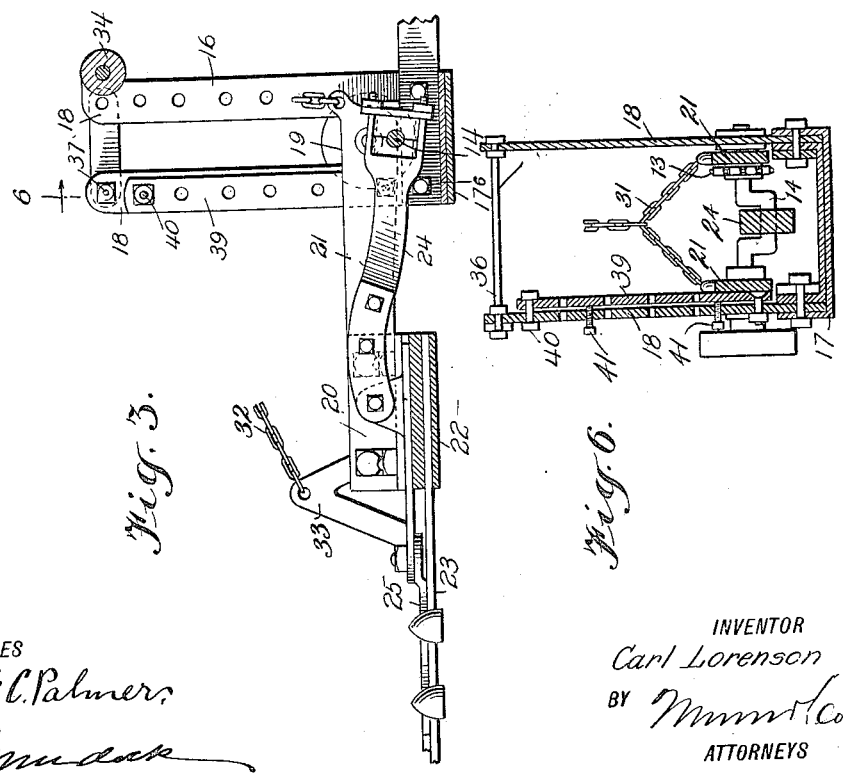
WITNESSES
Frank C. Palmer
C. S. Murdock
INVENTOR
Carl Lorenson
BY Munn & Co.
ATTORNEYS

UNITED STATES PATENT OFFICE.

CARL LORENSON, OF DAVENPORT, IOWA.

MOWING-MACHINE.

1,140,175. Specification of Letters Patent. Patented May 18, 1915.

Application filed November 20, 1913. Serial No. 802,048.

*To all whom it may concern:*

Be it known that I, CARL LORENSON, a citizen of the United States, and a resident of Davenport, in the county of Scott and State of Iowa, have invented a new and Improved Mowing-Machine, of which the following is a full, clear, and exact description.

This invention relates to mowing machines, and may be said to comprise improvements on the mower forming the subject-matter of my Letters Patent No. 886226, dated April 28, 1908.

Among the objects of this invention are to provide means within reach of the driver for raising the finger-bar and knife-bar and maintaining them raised, either horizontally or at an angle; to provide means for taking up the drag of the finger-bar; to provide draft connections between the draft mechanism of the machine and the parts supporting the finger-bar from the frame of the machine, whereby side-draft is obviated; to provide means for protecting the pitman from tall grass being bent thereover; to provide a grass deflector for directing grass away from the shoe carrying the finger-bar to the knife-bar; to provide means for varying the speed by means of sprocket wheels of various sizes; and to provide removable means for spacing the finger-bar an extraordinary distance from the side of the machine, for special work.

The invention consists in the various novel constructions and arrangements for accomplishing these and other objects which will be apparent as the specification proceeds.

Reference is to be had to the accompanying drawings forming a part of this specification, in which similar characters of reference indicate corresponding parts in all the views.

Figure 1 is a plan view of the improved machine; Fig. 2 is a front view; Fig. 3 is a vertical transverse section through certain of the parts, on an enlarged scale; Fig. 4 is a view showing the one-way clutch between a ground wheel and the hollow shaft adapted to be driven thereby; Fig. 5 is a detail of an operating lever and the flexible connection secured thereto; and Fig. 6 is a sectional view on the line 6—6 in Fig. 3.

Referring to these views, the numeral 1 indicates any suitable form of wheeled frame, provided with ground wheels 2.

3 is a shaft adapted to be driven by one of the ground wheels during forward movement only, by means of dogs 4 and teeth 5 (see Fig. 4); and 6 is a slidable clutch member and 7 its operating lever, for coupling and uncoupling a bevel gear 8 with reference to said shaft. The bevel gear 8 is in mesh with another bevel gear 9, the latter being mounted on a longitudinal shaft 10, which carries a plurality of sprocket wheels 11 of different sizes near its forward end, this last constituting one of the novel features of the present invention. From one or other of the sprocket wheels 11 passes a chain 12 to a sprocket wheel 13 on a crank-shaft 14, which is hereinafter more fully described. Preferably a chain tightener 15 is provided, as shown in Fig. 2.

The numeral 16, see Figs. 2 and 3, designates an upright guide member in which the crank-shaft 14 slides up and down. In its preferable construction, said guide member includes a shoe 17 and a pair of upright guide standards 18 rising from the front and rear portions thereof. Journal blocks 19 are mounted slidably between the members of the pairs of standards, and by these blocks the crank-shaft 14 is directly carried.

Mounted pivotally on the straight portion of the crank-shaft 14 is a finger-bar carrier 20, comprising preferably two arms 21 and a shoe 22. To this carrier 20 is secured a finger-bar 23; and a pitman 24 connects the crank-shaft 14 with the knife-bar 25.

The guide member 16 is adapted to be secured by a spacing member 28 to a brace 26 forming part of the wheeled frame; said brace 26 and a brace 27 being preferably secured together and affording each other mutual support. In such case, the finger-bar is disposed much farther inward than shown in the drawings. The finger-bar may be spaced outward from the side of the machine, as for cutting hedges and ditches, by means of a spacing member 28, (see Fig. 2) which after the member 16 has been disconnected from the brace 26, may be interposed between these parts and secured thereto, acting in the nature of a splice or interposed extension.

For raising the finger-bar and sustaining it at an angle or horizontally, I provide individual operating levers 29 and 30. From these levers extend raising connections, preferably, though not necessarily, in the form of chains 31 and 32 (see Figs. 1 and 2), which are secured respectively, to the arms 21 at the region of the crank shaft 14 and to a bracket 33 rising from the finger-bar carrier 20 near the other end thereof. These chains 31 and 32 pass upward over a roller 34, connecting a front and a rear standard 18; and thence the chain 31 passes around a roller 35 carried by the frame 1, while the chain 32 passes under a roller 36 and is secured to the lower arm of the lever 30, which is a bell-crank lever. The two standards 18 not connected by the roller 34 are connected by a member, as a rod 37, which is thus disposed transversely over the pitman 24 and serves as a guard to prevent tall grass being bent thereover.

In order to guide grass away from the shoe 22 to the finger-bar 23, I provide a grass deflector 38, which is in the nature of a curved blade, secured to the front part of said shoe and extended laterally outward and backward in a plane above the finger-bar.

For purpose of compensating for the drag of the finger-bar 23, I provide a plate 39, which is interposed between a rear standard 18 and the rear arm 21 of the finger-bar carrier 20. This plate is preferably secured to the standard 18, as by bolts and nuts 40. Set screws 41 are extended through holes provided for adjustment in the standard and bear against the rear face of the plate 39. Consequently, by loosening the nuts 40 and by shifting the set screws 41, the plate 39 can be adjusted to take up the drag of the bar.

The unbalanced drag of the machine, particularly when the cutter bar is in service, is compensated or equalized by the spreader bar 42 and the connecting bar 45. The bar 45 is pivotally mounted upon a bracket plate 49, as best shown in Fig. 2 of the drawings. The bracket plate 49 is mounted at the end of a loop 50, which is extended from the under side of the pole 44. The spreader bar 42 is pivotally connected with the bar 45 by means of a pivot bolt 43 and at a point on the bar 45 intermediate the ends thereof, as seen best in Fig. 1 of the drawings. The movement of the bolt 43 is limited by a slot 51 formed in a plate 52 mounted on the upper side of the pole 44, as best seen in Fig. 1 of the drawings. The long end of the bar 45 is connected to the shoes 17 and 22 by spiral spring draft connections 47 and 48. By means of this arrangement, it will be seen, the immediate effect of an increased load on the cutter bar would be to transfer the increased load direct to the bar 45 and through it to the spreader bar 42 and the team attached thereto.

While I have described the preferable forms of my several improvements in particular language, it will be understood that the form of the parts may be varied and that it is not essential that the parts be connected in all instances as specifically described.

In conclusion, I would point out that the desirability of the use of chains in my machine, is that they may be readily lengthened and shortened, according to whether the extension member 28 is or is not used.

Having thus described my invention, I claim as new and desire to secure by Letters Patent:—

1. In a mowing machine, a wheeled frame; an upright guide member carried by said frame; a crank-shaft vertically adjustable in said guide member; a finger-bar carrier pivoted on a straight portion of said crank-shaft; a finger-bar; a knife-bar; a face plate carried by said guide member, between the same and said finger-bar carrier; and means for adjusting said plate to compensate for the drag of said finger-bar.

2. A mowing machine comprising a wheeled frame; a finger-bar; a supporting member for said finger-bar, said member being secured to said frame; and a spacing member between said supporting member and said frame, for laterally adjusting said finger-bar to provide various working areas for said finger-bars.

In testimony whereof I have signed my name to this specification in the presence of two subscribing witnesses.

CARL LORENSON.

Witnesses:
 ALFRED F. ZIEBARTH,
 L. R. DESSOITT.

Copies of this patent may be obtained for five cents each, by addressing the "Commissioner of Patents, Washington, D. C."